A. NIEDHAMMER.
COMBINATION CHUCK.
APPLICATION FILED FEB. 13, 1911.
1,052,087.                                       Patented Feb. 4, 1913.
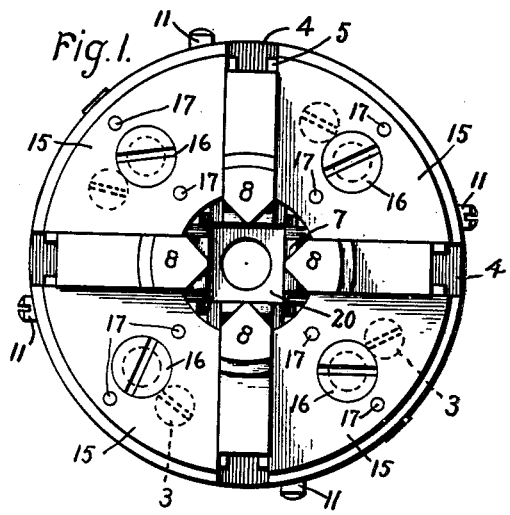
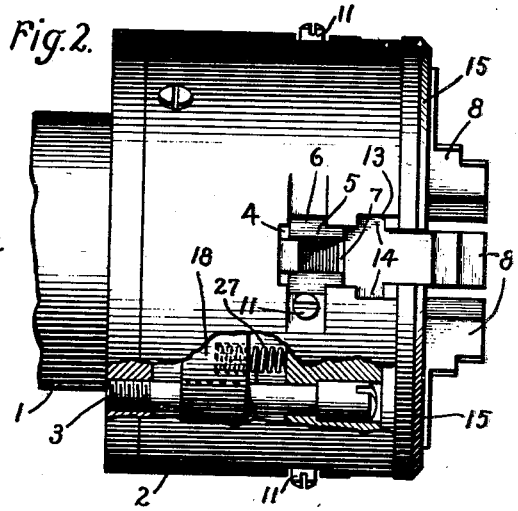
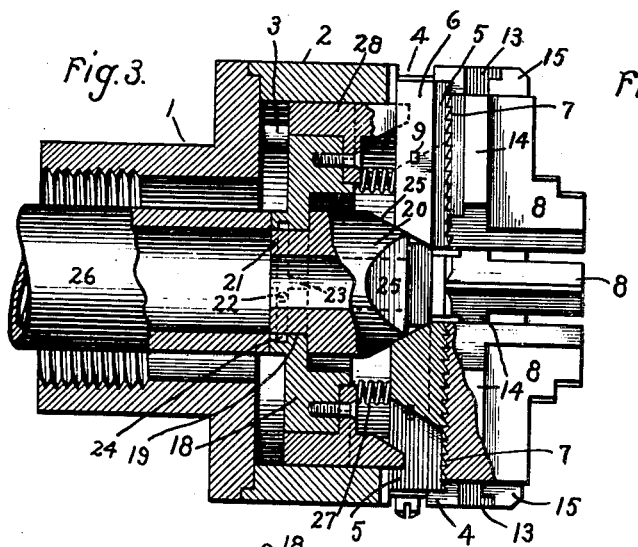
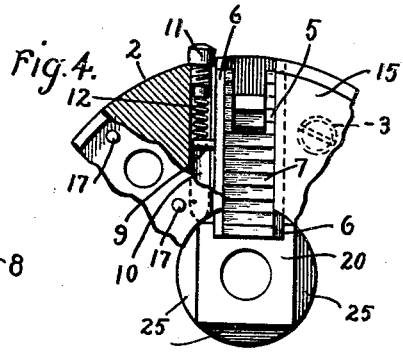
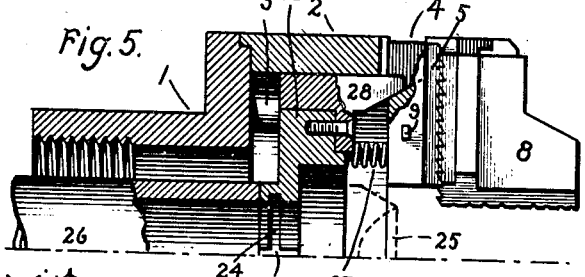
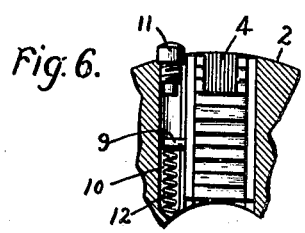
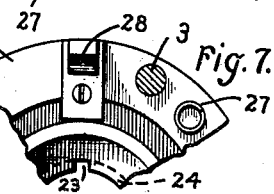
Witnesses
J. Ellis Glen.
Marcus L. Byng.
Inventor
Adam Niedhammer
by Alexander F. MacDonald
Atty.

UNITED STATES PATENT OFFICE.

ADAM NIEDHAMMER, OF SCHENECTADY, NEW YORK.

COMBINATION-CHUCK.

1,052,087.  Specification of Letters Patent.  Patented Feb. 4, 1913.

Application filed February 13, 1911. Serial No. 608,406.

*To all whom it may concern:*

Be it known that I, ADAM NIEDHAMMER, a citizen of the United States, residing at Schenectady, New York, have invented certain new and useful Improvements in Combination-Chucks, of which the following is a specification.

The present invention relates to combination chucks and especially to those intended for use on hand or automatic screw machines.

The object of the invention is to provide a chuck of simple and rugged construction which is capable of grasping and holding the work to be machined either from the outside or the inside.

For a consideration of what I believe to be novel and my invention, attention is directed to the accompanying description and claims appended thereto.

In the accompanying drawing which illustrates one of the embodiments of my invention, Figure 1 is a front view of the chuck; Fig. 2 a side elevation thereof; Fig. 3 an axial section; Fig. 4 a detail showing one of the springs for moving the dogs inwardly to release the work; Fig. 5 is a partial axial section showing the parts arranged to grasp the work from the outside; Fig. 6 is a detail view showing one of the springs for moving the dogs outwardly to release the work, and Fig. 7 is a detail view of one of the cams.

1 indicates a face plate or other support which is internally screw threaded to permit of its being mounted on the spindle of an inner tube screw machine. The right-hand end is flanged and shouldered to receive the main body 2 of the chuck. By shouldering the body and the face plate absolute alinement is assured. The body is secured to the face plate by a number of axially extending screws 3.

The main body comprises the cylindrical portion that is shouldered to receive the support 1, and a perpendicular portion or wall formed integral therewith in which the heads of the screws 3 are seated as shown in Fig. 2, and in which are slots to receive the sliding jaws and their carrying blocks. The inside or bore of the body is finished to receive and act as a guide for the sliding head 18, as will appear later. The body is provided with four radial slots 4 arranged 90 degrees apart. Their shape is best shown in Fig. 2. In each of these slots is a radially movable block 5 which is provided with shouldered projections 6 that engage and make a sliding fit with the walls of the slot. This serves to prevent the block from moving other than in a radial direction. The right hand side of the block is provided with teeth 7 that lock with corresponding teeth on the jaws 8. The block may with advantage be made of hardened steel. On the side of each block, as shown in Fig. 4, is a pin 9 which works in a radial slot 10 in the chuck body. Between this pin and a screw 11 at the end of the slot is a coiled compression spring 12 which serves to press the sliding block inward to release the work, it being understood that the jaws grip the work from the inside. The jaws 8 are arranged to slide radially in the slots 13 in the body. The slots 4 and 13 form sets, each containing a sliding block and a jaw. The jaws are provided with rectangular projections 14 on opposite sides which engage the walls of the slots in the body and serve to confine the movements of the jaws to those in a radial direction. Being of substantial size and closely fitting into the body they directly transmit the strains from the jaws to the body. Owing to the shape of each sliding block and each jaw, they are individually held within the body and each transmits its own strains directly to the walls of its containing slot. The teeth between said parts form a motion transmitting means and owing to the shape of the parts and their holding walls, they cannot separate and permit one to slip with respect to the other. This arrangement enables me to do away with fastening bolts or screws and is a very desirable feature. The jaws can be removed by taking off the internally shouldered segmental plates 15 that are secured to the body 2 by screws 16. Pins 17 are mounted in the body to facilitate assembling the plates in place. They also assist in holding the plates against angular displacement. The shoulders on the plates prevent outward movement thereof. In some cases these plates may be formed integral with the body if desired. The right hand side of each jaw is provided with one or more shoulders for gripping the work internally.

The means for moving the sliding blocks 5 and the jaws 8 carried thereby will now be described.

The body 2 is bored or hollowed out on the back or left hand side as shown in the drawing, and located therein is a head 18 that makes a sliding fit with said bore. This head is provided with a central opening 19 to receive the plug 20. The plug is provided with a hub 21 that makes an easy fit in the opening 19. At diametrically opposite points the hub 21 is provided with two pins 22, one of which is shown in dotted lines Fig. 3. The opening 19 is provided with two axially extending slots 23, one of which is shown in Fig. 7. It is also provided with an annular groove 24, shown in dotted lines Figs. 3 and 7, which communicates with the slots 23. In assembling the parts, the pins 22 are caused to register with the axial slots 23, the plug is then pushed to the left until the shoulder thereon rests on the transverse face of the head 18. The plug is then turned angularly either to the right or left to cause the pins 22 to enter the annular groove 24 after the fashion of a bayonet-joint. These pins cause the plug to move back and forth with the sliding head 18. Owing to the flat cam faces on the plug which engage the sliding blocks the plug cannot turn far enough after the parts of the chuck are once assembled in place to permit the pins 22 to enter the slots 23 and release the plug from said head, as will appear later. The plug is provided with four flat and inclined or beveled faces 25 arranged 90 degrees apart and forming a square as best shown in Fig. 4. Each of these beveled faces engages a corresponding beveled face on a sliding block as shown in Fig. 3. These faces are of generous area and are also hardened to reduce wear. Owing to the fact that they are flat and engage flat faces on the sliding blocks arranged 90 degrees apart the plug is prevented from turning after the parts are assembled. On the other hand, owing to the fact that the plug is rotatably mounted in the opening 19 in the sliding head, it will, when the parts of the chuck are being assembled, freely adjust itself angularly to the proper position to cause all of its cam faces to properly engage all the bevel faces on the inner ends of the sliding blocks 5. The principal advantage of this resides in the fact that the parts can be separately and accurately made and when assembled will take their proper positions. In other words, it avoids having to individually fit parts which must later occupy exact positions with respect to each other.

Engaging with the back or left hand side of the sliding head 18 is a tube or equivalent device 26 forming an actuator for forcing the cam plug to the right and therefore the sliding jaws outwardly to cause the shoulders on said jaws to grip the work from the inside. This actuator is moved by the shifting lever of the screw machine. As is well understood, these levers are so arranged that when moved to a given position they will stay there until released. Carried by the sliding head and located between it and the transverse wall of the main body are two or more, usually four, coiled compression springs 27. These springs act at all times to force the sliding head 18 and cam plug 20 backward or to the left to release the jaws from the work. The radially disposed springs 12 also have the same function. It will be seen from the construction that the movement of the screw machine lever to cause engagement of the jaws with the work must overcome the forces exerted by these springs.

Thus far my invention has been described as arranged to grip work from the inside. It will now be described to grip the work from the outside.

Dovetailed and pinned or otherwise secured to the sliding head 18 are as many cams 28 as there are sliding blocks. These blocks 5 are shaped as before to snugly fit the radial grooves 4. They are provided with suitable teeth or projections as shown in Fig. 5 to engage those on the jaws to form motion transmitting means. In using the chuck for outside gripping I may remove the central cam plug or not depending on the shape of the sliding toothed blocks. Each of the blocks is provided with a cam face at its outer end and engaging therewith is one of the cams 28 carried by the sliding head 18. When the head is moved to the right the cams carried thereby force the block and their jaws inwardly, the latter gripping the work from the outside. Since the jaws must be moved outwardly to release the work I reverse each spring 12 and instead of placing it between the pin 9 and screw 11 as in Fig. 4, I place it between the pin 9 and the bottom of the slot 10 as in Fig. 6. As will readily be seen a movement of the actuator 26 to the right will now cause the cams 28 to move the sliding blocks 5 inwardly and with them the jaws 8. It will be noted in both cases that the sliding head 18 carries the cams for actuating the blocks and is therefore a common actuator for both sets of cams, i. e., those for outside and inside gripping of the work. Whether the central plug 25 with its cam face is left in the chuck or not depends on the character of the blocks used for the outside gripping. In any event, it is a very simple matter to take it out, and this without removing the chuck from its support 1.

By reason of my improved construction it will be seen that by unscrewing the support or face plate 1 the chuck as a whole can be removed and with it all of its actuating mechanism except the actuating tube 26 that forms a part of the screw machine. Since the tube 26 is separate from the sliding head 18 the removal of the chuck in no way affects said tube. From the foregoing it will be evident that my chuck possesses advantages that are important in the way of simplicity and ease of mounting and removal, thereby permitting the machine to be used for various purposes, and this without disturbing the driving machine.

By reason of my improved construction, I am enabled to dispense with split-chucks which are commonly used in screw machines. This is a great advantage because such chucks are limited to one size of stock whereas my chuck can be used for many different sizes without adjustment. By adjusting the jaws on the sliding blocks the range can be greatly increased. Since the jaws are substantial in size and have broad bearing surfaces they will securely grip the stock, and have great driving power and be securely held in the body. Any wear of the parts is automatically taken up by the wedge-action of the cam surfaces.

My chuck can be used with two, three or more jaws either for inside or outside gripping, and will hold stock which is regular as well as irregular in shape. In changing from inside to outside gripping it is unnecessary to remove the chuck from the machine. The chuck will instantly grip and automatically center the work and will also quickly release the work while the machine is in full motion.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means within the scope of the appended claims.

What I claim as new and desire to secure by Letters Patent of the United States, is,—

1. In a chuck for internal and external gripping, the combination of an annular body having a cylindrical central bore and sets of radial slots, blocks and jaws movably mounted in said slots, a face plate adapted to be mounted on a driving spindle, means for attaching the body to the face plate, a head located in front of the plate which makes a sliding fit with and is guided in its movements by the bore of said body, cams which are detachably supported by the head and are moved in an axial direction by it to move said blocks and jaws radially, and an actuator which extends through the face plate and engages the sliding head, said actuator being separate from the head.

2. In a chuck for internal and external gripping, the combination of an annular body having a cylindrical central bore, a perpendicular front wall and sets of radial slots which extend through the wall and body, blocks and jaws mounted to slide as a unit in the slots, a face plate for supporting and driving the annular body, a sliding head mounted within the body between the said wall and the face plate, whose peripheral surface makes a sliding fit with and is guided by the bore of said body, cams carried by the head for moving the blocks and jaws radially, and a tubular actuator which extends through the face plate and is arranged to press against the sliding head to move it.

3. In a chuck for internal and external gripping, the combination of a face plate, a shouldered annular body mounted thereon, which is provided with a perpendicular front wall and an annular bore extending between the wall and the face plate, and radial slots which extend through said wall and terminate at the periphery of the body, blocks and jaws arranged to slide in the slots, segmental plates located between the jaws that assist in holding them in place, means for securing the plates to said wall, a sliding head which is mounted within the bore of the body and is guided thereby, a cam for moving each block which is mounted in the head and moved thereby, means for attaching the annular body to the face plate which is seated in said wall and pass through the sliding head into the face plate, and an actuator that is separate from the sliding head and is arranged to press against it to cause movement thereof.

4. In a chuck of the character described, the combination of an annular body, jaws carried thereby, an axially movable head located within and guided by the bore of said body, a centrally located plug which is removably attached to the head and has cams for actuating the jaws, said plug being common to all of the jaws, and an actuator which presses against the head for moving it and said plug.

5. In a chuck of the character described, the combination of an annular body, jaws carried thereby, an axially movable head located within and guided by the bore of said body, a plug which is removably supported by the head and is free to adjust itself angularly therein, said plug having as many beveled cam faces as there are jaws for actuating them, and means for moving the head axially.

6. In a chuck of the character described, the combination of an annular body having a cylindrical bore and a perpendicular wall having radial slots, a face plate for supporting and driving the body, blocks and jaws located in the slots, a sliding head which is guided by the bore of the body, a plug that is mounted in the head and is positively moved in an axial direction thereby but is free to turn angularly, said plug being provided with as many cam faces as there are blocks for moving the latter and which are angularly displaced, and an actuator which acts through the head to move said plug axially.

7. In a chuck of the character described, the combination of a body having a central bore, jaws carried thereby, a head movable axially in the body and guided by the wall of the bore, said head having an axial opening, a plug having a cylindrical hub which is fitted to said opening, a pin carried by the hub which fits into a groove in the head and permits said plug to adjust itself angularly and holds it against independent axial movement, flat beveled cam faces on the plug for moving the jaws, and an actuator for the head.

In witness whereof, I have hereunto set my hand this 11th day of February, 1911.

ADAM NIEDHAMMER.

Witnesses:
RICHARD G. POVEY,
HELEN ORFORD.